UNITED STATES PATENT OFFICE.

JOHANNES NICOLAUS BRÖNSTED, OF COPENHAGEN, DENMARK, ASSIGNOR TO THE FIRM OF HELLESENS ENKE & V. LUDVIGSEN, OF COPENHAGEN, DENMARK.

GALVANIC BATTERY-CELL OF THE MERCURIC-OXID TYPE.

1,219,074. Specification of Letters Patent. Patented Mar. 13, 1917.

No Drawing. Application filed August 4, 1915. Serial No. 43,604.

*To all whom it may concern:*

Be it known that I, JOHANNES NICOLAUS BRÖNSTED, professor at the University of Copenhagen, a citizen of the Kingdom of Denmark, and resident of Copenhagen, (whose post-office address is No. 83 Sölvgade, Copenhagen, Denmark,) have invented certain new and useful Improvements in Galvanic Battery-Cells of the Mercuric-Oxid Type; and I do hereby declare the following to be a full, clear, and exact description of the invention, such as will enable others skilled in the art to which it appertains to make and use the same.

For galvanic cells with zinc anodes and with depolarization by means of mercuric oxid alone or in conjunction with other means of depolarization, and, as a rule, mixed with an indifferent conductor (graphite, or the like), it has been proposed to use either salts or alkali hydroxids as electrolytes. The solution has been comparatively weak, and the use of sodium hydroxid has been suggested, since it has been generally and rightly considered to be just as good as potassium hydroxid for electro-chemical purposes, and since in practice, it is to be preferred on account of its lower price and weight.

From the experiments upon which the present invention is based, it appears that, with respect to constancy, capacity, reducibleness of volume, etc., the cited mercuric oxid cells can be essentially improved by a special kind and quality of the electrolyte, and that the properties possessed by a mass of mercuric oxid and graphite as a depolarizer in battery-cells with alkaline electrolyte and with zinc anode can only thus be fully utilized.

The experiments prove that concentrated alkali lye, which, as is well known, generally precipitates (*i. e.* cannot dissolve) even very easily soluble salts of the same alkali metal, can nevertheless, dissolve considerable quantities of alkali zincate, and that, in battery-cells of the cited kind, it is possible to use as electrolyte concentrated alkali lye (with over six or even over ten gram-molecules of hydroxid per liter), without the occurrence of disturbances in the normal process at the anode, and without precipitation of alkali zincate, notwithstanding the great accumulation of material. The experiments furthermore prove that the strong concentration is possible in using either sodium hydroxid or potassium hydroxid, or a mixture of both, but that it is most effective when potassium hydroxid is used, and that the difference in the effectiveness of the two hydroxids increases greatly in proportion to the degree of concentration. Experiments have proved that potassium hydroxid, which in dilute solution has about the same effect as sodium hydroxid, in concentrated solution has special advantages over sodium hydroxid.

This must be considered to depend at least partly upon the fact that potassium hydroxid, which, in dilute solution, has a conductive power not much different from that of sodium hydroxid, in concentrated solution is a better conductor than the sodium hydroxid solution of the same concentration, and also has less viscosity, so that the diffusion at the electrodes, which is a condition for effective depolarization, even in spite of the great accumulation of material takes place smoothly, as when ordinary dilute solutions are used, which per volume only can release a much smaller quantity of energy.

As the great capacity of the mercuric oxid electrode is fully utilized only with the use of very concentrated alkali lye, so, on the other hand, these strong solutions can only be used to advantage with an electrode which, like the mercuric oxid electrode, is able to give an almost theoretical efficiency or out-put, under favorable conditions. In all cases where a small volume and comparatively strong and steady current delivery are required, thus in all cases where the internal resistance and the polarization plays a part, the present combination (mercuric oxid cathode, concentrated alkali hydroxid solution, and zinc anode) will be superior to all combinations used heretofore, both with and without mercuric oxid and both with and without alkaline electrolyte.

Furthermore, the experiments have proved that the addition of thickening agents (starch, and the like) which is necessary in dry cells pocket batteries, etc., has no effect on the above cited facts.

I claim:

1. In a galvanic battery having a mercury oxid cathode and a zinc anode, an electrolyte of a solution of an alkali metal hydroxid having a concentration of about six gram-molecules per liter.

2. In a galvanic battery having a mercury oxid cathode and a zinc anode, an electrolyte comprising an aqueous solution of an alkali metal hydroxid of a concentration of from six to ten gram-molecules per liter.

In testimony that I claim the foregoing as my invention, I have signed my name in presence of two subscribing witnesses.

JOHANNES NICOLAUS BRÖNSTED.

Witnesses:
ERNEST BOUTARD,
P. HOFMAN BAUZ.